United States Patent

Coucoulas

[15] 3,669,333

[45] June 13, 1972

[54] BONDING WITH A COMPLIANT MEDIUM

[72] Inventor: Alexander Coucoulas, Bridgewater Township, Somerset County, N.J.

[73] Assignee: Western Electric Company Incorporated, New York, N.Y.

[22] Filed: Feb. 2, 1970

[21] Appl. No.: 7,473

Related U.S. Application Data

[63] Continuation-in-part of Ser. No. 651,411, July 6, 1967.

[52] U.S. Cl. .................................228/3, 29/471.1, 156/323, 228/4, 269/310

[51] Int. Cl. .......................................................B23k 21/00

[58] Field of Search ..............269/292, 310, 311, 317; 228/3, 228/4, 5, 6; 29/470, 471.1; 156/323, 73

[56] References Cited

UNITED STATES PATENTS

| | | | |
|---|---|---|---|
| 593,879 | 11/1897 | Du Brul | 269/310 X |
| 2,524,932 | 10/1950 | Schulman | 156/323 X |
| 2,710,046 | 6/1955 | Markus et al. | 156/325 X |
| 3,146,524 | 9/1964 | Tetzloff | 29/407 |
| 3,284,962 | 11/1966 | Hott et al. | 269/310 X |
| 3,379,595 | 4/1968 | Bracey, Jr. | 156/323 X |
| 3,507,733 | 4/1970 | Davidson | 156/323 X |
| 3,520,055 | 7/1970 | Jannett | 269/21 X |
| 2,524,932 | 10/1950 | Schulman | 156/323 |

*Primary Examiner*—John F. Campbell
*Assistant Examiner*—Robert J. Craig
*Attorney*—W. M. Kain, R. P. Miller and R. C. Winter

[57] ABSTRACT

A plurality of independently displaceable pins are employed to apply bonding pressure to a compliant medium at widely spaced bonding sites. The pins permit compensation for workpiece irregularities between the bonding sites such as substrate waviness, warpage, lack of parallelism, etc., while the compliant medium compensates for localized workpiece irregularities such as variations in the thickness of leads and/or land areas.

12 Claims, 20 Drawing Figures

INVENTOR
A. COUCOULAS
By W. L. Williamson
ATTORNEY

BONDING WITH A COMPLIANT MEDIUM

CROSS-REFERENCES TO RELATED APPLICATIONS

This application is a continuation-in-part by way of a division of the application by A. Coucoulas, Ser. No. 651,411, filed July 6, 1967, and assigned to Western Electric Company, Incorporated.

BACKGROUND OF THE INVENTION

1. Field of the Invention

This invention relates generally to bonding and, more particularly, it relates to the bonding of two or more first workpieces to a second workpiece. The first workpieces may comprise two or more small wires, integrated circuit devices, small, brittle crystals, or beam-lead transistor or integrated circuit devices. The second workpiece may comprise a thin-film or integrated circuit formed on an insulating substrate, a printed circuit board, or the like. The invention has application to the bonding of workpieces other than the above-described types, but since it is particularly adapted for such workpieces it will be described with reference thereto.

In simultaneously bonding a plurality of leads, workpiece irregularities render reliable bonding difficult. For example, if 10 leads are positioned on a substrate and eight of them are exactly the same size but two are 10–20 percent smaller, a flat ram or bonding tip will make only eight bonds. Or, if enough pressure is applied to contact all 10 leads, eight of them will be deformed too much, resulting in a weak or "killed" bond. In another case, the leads may be of exactly equal size, but the thickness of the metallic land areas on the substrates may vary, the thickness of the substrate may vary, or the bonding tip may be worn or misaligned, sufficiently to prevent the energy source (ram or ultrasonic bonding tip) from making an energy-transmitting couple with each lead. Thus, the problem is not bonding leads simultaneously per se, but rather reliably bonding every lead in a group, simultaneously, every time. Even with the most sophisticated quality control techniques and the closest tolerances obtainable, simultaneous bonding of a number of leads has not proven to be reliable or economic.

In addition, as circuits have become more and more complicated, it has become necessary to bond a plurality of devices such as beam-lead devices to a circuit. As will be appreciated, it is highly desirable to bond all of these beam-lead devices in a single bonding operation. As a result, a great deal of effort has been expended in attempting to develop so called multichip bonding techniques. As the substrate of the circuit may be non-parallel, i.e., the two major surfaces of the substrate may not be parallel, the substrate may be warped or wavey, or the bonding tool may not be parallel, the bonding tool may apply excessive force to one area of the substrate and insufficient force to another area thereby fracturing the substrate and/or making unreliable bonds. Accordingly, it is extremely difficult to reliably bond at widely spaced bonding sites without compensating for such workpiece irregularities. Therefore, multichip bonding must not only solve all of the above-mentioned problems, but as relatively large areas are involved damage to the substrate of the circuit must also be avoided. This is true of lead bonding at widely spaced bonding sites as well as multichip bonding.

2. Description of the Prior Art

The techniques of ultrasonic and thermocompression bonding, particularly as applied to bonding leads to substrates, are well known in the art. In the field of electric welding the use of flexible electrodes and electrodes mounted on resilient supports was proposed many years ago (see, for example, U. S. Pat. No. 475,191 and No. 2,226,424).

Gang welding at several spaced welding stations was proposed in U. S. Pat No. 3,053,125. The patentees place the workpieces on movable supports located under each bonding head, then move the support up to clamp the workpieces in place. The welding heads are located on a long rod at points of antinodal vibration. The rod is connected to an ultrasonic transducer, and a single application of ultrasonic energy will make a single bond at each welding station. There is no known prior art utilizing a compliant medium in connection with ultrasonic or thermocompression bonding.

There has been proposed, however, a method of soldering connections to a plurality of flexible cables at one time. In this method, the portions of the conductors desired to be bonded are coated with solder, and the cable assembly is laid over the contact elements, which rest on a rigid support. A Teflon (trademark) sheet is laid over the cable insulation and a quartz plate is laid on top of the sheet. A tungsten halogen lamp provides infrared heat energy which passes through the quartz, Teflon and insulation (all of these members being more or less transparent to infrared radiation) which melts the solder and makes the bond. The quartz acts as a heat sink and a clamp (see Broyer and Mammel: "Flex Cable Interconnections Mass Bonded With Infrared" Proceedings, NEP/CON '67, July 1967).

OBJECTS OF THE INVENTION

It is a general object of the present invention to provide an apparatus for bonding metallic surfaces of workpieces.

A further object of the present invention is to provide an apparatus for bonding a plurality of workpieces to a substrate simultaneously.

Yet another object of the invention is to provide an apparatus for simultaneously bonding the leads of a plurality of beam-leaded devices to metallic land areas of a substrate.

Still another object of the invention is to provide an apparatus for bonding the leads of a plurality of beam-lead devices to a substrate while compensating for workpiece irregularities.

Another object of the invention is to provide a novel jig assembly for bonding at widely spaced areas of a substrate.

Various other objects and advantages of the invention will become clear from the following summary and detailed description thereof.

SUMMARY OF THE INVENTION

In essence, the present invention is based, at least in part, on the discovery that the use of a compliant or deformable medium to hold the workpieces has many significant advantages in bonding, and that sufficient thermal and/or mechanical energy can be transmitted through or absorbed by such a medium to effect a good bond between the workpieces.

Understanding of the invention will be facilitated by considering the transmission of energy through a compliant or deformable medium.

While a compliant medium may be easy or difficult to deform, it will transmit pressure while absorbing energy. Thus, if a 100 pound weight is place on a 1 inch cube of steel resting on a rigid support, the steel will deform very little and the pressure on the support will be 100 psi. If the cube is made of hard rubber rather than steel, the deformation will be much greater but the pressure on the support will still be 100 psi. The energy of deformation in each instance is represented by the distance moved by the weight lower than one inch. If the weight squeezed the rubber to a height of ¾ inch, for example, the energy of deformation would be $(1\ ¾) \times 1/12 \times 100 =$ 2.09 foot pounds. The potential energy represented by the 100 psi pressure on the support is still available to perform work.

If a second piece of deformable material is placed between the rigid support and the hard rubber cube, there will be a relative deformation of both substrates. Naturally, if the second material is also a cube of hard rubber, the deformation of both pieces will be equal. The distribution of deformation between two dissimilar materials can be determined from the stress-strain curve of each material. That is, under a given stress, the strain of each material can be read directly from the curve. This is not limited by the points on the curves where the mode of deformation changes from elastic to plastic (i.e., the elastic limit). Thus, if a cube of material A is resting on a cube of material B which is, in turn, resting on a rigid support, and a 100 pound weight is placed on cube A, the deformation of both may be elastic or plastic, or one may deform elastically while the other deforms plastically. In any case, the behavior of the respective materials can be predicted from the stress-strain curve.

From the foregoing it is believed to be clear that under the influence of pressure (i.e., mechanical energy) alone, one compliant (or deformable) material can deform another deformable material.

The above discussion was concerned only with two cubes of the same size. If, in place of the 1 inch cube of material B, there is substituted two ¼ × ¼ × 1 in. bars, the pressure on each bar will be 200 psi since the total pressure must in this instance be transmitted through ½ in$^2$ of surface. However, the deformation of material A will be considerably different. With two equal cubes, both materials will tend to flatten, i.e., bulge outwardly on the sides, where they are not confined. If cube A is resting on the two bars presenting an aggregate surface area of ½ in$^2$, however, cube A will tend to deform downwardly, between or around the bars. If, now, in place of cube A there is substituted a round rod of ½ in. diameter laid across the two bars, the stress-strain situation changes radically. The area of contact between rod A and bars B is very small, so the stress (for the same 100-pound weight) must be very large. This will cause an appropriate increase in the strain (deformation) of both materials. In other words, it is the stress at the interface, rather than the total force applied, which determines the deformation of both materials. Thus, by controlling the geometry of the two materials, a relatively small force can be made to cause a relatively large deformation.

The mode and amount of deformation will also be radically influenced by the application of thermal energy. This is also predictable from the stress-strain curve of the chosen materials at the specified temperature.

In summary, the following factors can be used to control relative deformation between the two bodies: (1) Selection of materials; (2) Total mechanical energy applied; (3) Geometry of the pieces; and (4) Application of heat.

The foregoing principles are directly applicable to the present invention, and a simple example will illustrate this. It is desired to bond a 16-lead beam-lead device (gold leads) to the gold land areas on a substrate, using a ram pressure of 30 pounds at 400° C. The leads are material B, the land areas are the rigid support, and material A is what is referred to herein as the compliant medium. To select a suitable compliant medium, the stress-strain curve of gold at 400° C is plotted, preferably on a log-log plot where $\sigma_o$, the yield point, is on the ordinate, and the slope of the curve is the strain hardening index. From this plot, the stress necessary to achieve any degree of deformation of the gold can be determined. If 50 percent deformation ($\sigma_1$) of the lead is desired, a particular stress, $\sigma_1$, will achieve it. If the compliant medium is twice as thick as the lead, it will only deform 25 percent in deforming the lead 50 percent, so any material having a stress-strain curve which deforms 25 percent ($\epsilon_2$) at the desired stress ($\sigma_1$) is a suitable medium. In this instance, 2024 aluminum is a satisfactory medium. Having selected a medium, the geometry is considered. The substrate rests on an anvil, the device is placed thereon, and the compliant aluminum frame, covering only the leads, is laid thereover. The heated ram is brought down under a 30 pound (absolute) load. The pressure at the ram-aluminum interface is found to be about 2000 psi. This is below the yield point of this alloy at 400° C. However, the available pressure at the aluminum-lead interface, which is a much smaller area, is in excess of 100,000 psi, which is greatly above the yield point of both metals, so that deformation occurs. When the aluminum has deformed around the leads and touches the substrate (as described in detail hereinbelow), the area of contact increases (and the pressure decreases) until it is the same as the area of the ram-aluminum interface, i.e., the pressure drops to about 2000 psi, and deformation stops.

As will be appreciated, the compliant medium by deforming around each lead compensates for variations in lead thickness, variations in land area thickness, local variations in substrate thickness, and local variations in parallelism between the substrate and the heated ram to permit the simultaneous multiple lead bonding. However, when leads are bonded at widely spaced bonding sites or a plurality of beam-lead devices are bonded simultaneously, the compliant medium may not adequately compensate for irregularities in the substrate such as lack of parallelism, waviness, or warpage, or irregularities in the bonding tool. Accordingly, a plurality of pins which are individually displaceable are advantageously employed to engage the compliant medium at selected bonding areas. In this manner, the compliant medium compensates for localized irregularities while the pins are individually displaced to compensate for irregularities between different bonding areas.

Bonds may also be made using ultrasonic energy by mounting the substrate on an anvil and vibrating the anvil to impart ultrasonic energy to the bonding sites. Thermal energy is advantageously applied just prior to the ultrasonic energy to facilitate deformation of the compliant medium about the beam-lead devices or discrete leads. Engaging the compliant medium at suitable bonding areas with individually displaceable pins to compensate for irregularities between the different bonding areas has the same advantages set forth above.

THE DRAWINGS

Understanding of the invention will be facilitated by referring to the following detailed description of the several embodiments, in conjunction with the accompanying drawings, wherein.

DESCRIPTION OF EMBODIMENTS

Figure 1A:
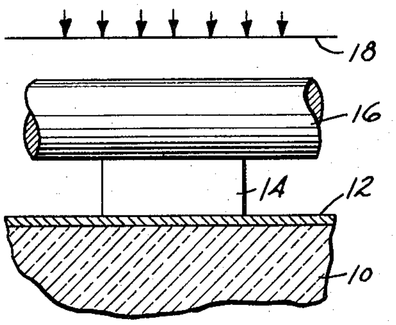
FIGS. 1A and 1B are side and end elevations, respectively, showing all parts in place for bonding a lead to a substrate by thermocompression bonding in accordance with the invention.
Figure 1B:
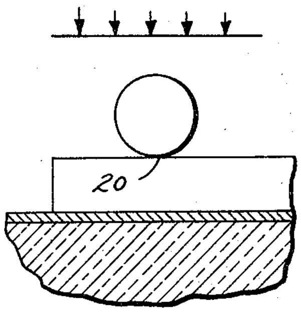
Figure 2A:
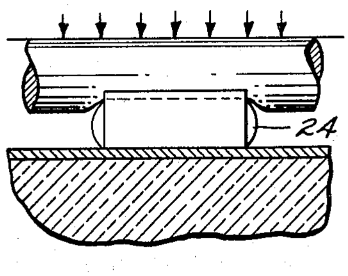
FIGS. 2A and 2B are similar to FIGS. 1A and 1B, showing all parts during thermocompression bonding in accordance with the invention.
Figure 2B:
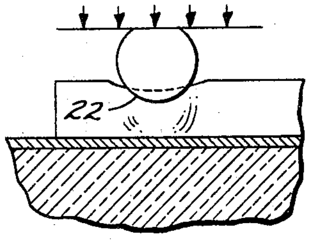
Figure 3A:
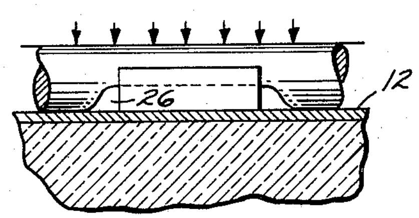
FIGS. 3A and 3B are similar to FIGS. 1 and 2, showing all parts after thermocompression bonding is complete
Figure 3B:
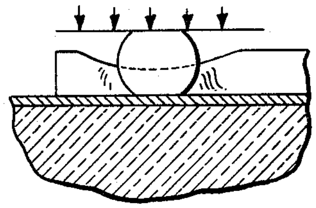

FIGS. 1–3 illustrate bonding of a single lead to a substrate. An insulating substrate 10 having a metallic land area 12 on the surface thereof is placed on a rigid support (not shown). A lead 14 is placed over land area 12 at the desired bonding point. For purposes of illustration, it can be assumed that substrate 10 is a high alumina ceramic, and land area 12 and lead 14 are both gold. The compliant medium is in the form of a wire 16 of a film-forming metal such as aluminum. A heated ram 18 initially clamps the workpieces to the support and, as pressure is applied, wire 16 and lead 14 commence to deform, as shown in FIG. 2. In particular, the line of contact 20 between the two pieces becomes a zone of contact 22, and bulges 24 appear on the unconfined edges of lead 14. At the same time, wire 16 deforms around lead 14. When bonding is complete, as shown in FIG. 3, the initial bulges have been deformed into area 26, and wire 16 has deformed so as to completely cover the entire bond area on both workpieces. The flow of the lead metal in the area 26 against the land metal 12 contributes to the quality of the bond.

The wire 16 will not itself bond to the workpieces because of the tough oxide film on its surface. Since film-forming metals (aluminum, nickel, titanium, tantalum, etc.) always have such oxide films and the thickness thereof can be readily controlled by anodizing, they are preferred as the compliant medium. Other materials can be employed and parting materials used to prevent bonding of the medium to the workpiece, but parting materials will of course be avoided where they might present a contamination problem.

Since gold is a relatively soft metal, compared to aluminum, one might think that the wire 16 would cut right through lead 14 or "mash" it completely, but this is not the case. Successful bonds of gold leads have even been made using nickel as the compliant medium, which is even harder than aluminum. Of course, when selecting a compliant medium, persons skilled in the art will obviously avoid metals and alloys that would not deform under the bonding conditions.

Bonds produced in the foregoing manner have been determined to be superior to bonds made by conventional ultrasonic and thermocompression techniques. This superiority is both statistical (i.e., the number of good bonds made per thousand) and absolute (i.e., bond strength in a shear-peel test). While not wishing to be bound to any particular theory of operation, it is believed that the reason for this superiority can be explained by reference to some of the fundamentals of ordinary thermocompression bonding.

It has been previously determined that, for a given ram pressure (i.e., load), there is a satisfactory range of bonding temperatures that will produce a good bond. Conversely, for a given bonding temperature, there exists a range of loads that will produce a good bond. This assumes a constant bonding cycle. As would be expected, the higher the load the lower the satisfactory temperature range, and vice versa. Expressed differently, it could be said that there is a range of total bonding energy which will produce a good bond, and this can be divided between mechanical and thermal energy in any desired way. If insufficient total bonding energy is applied, the lead will not adhere to the substrate (i.e., in a pull test, separation will occur at the interface). If too much bonding energy is applied, the lead will be "killed" (i.e., in a pull test, the lead will break). Prior workers have studied the geometry of various bonding tips at great length to overcome the "killing" problem, but to little avail.

In bonding with a compliant medium in accordance with the present invention, it has been determined that the upper limit of total bonding energy that produces a good bond is raised substantially. Thus, the problem of "killing" a bond is substantially reduced. This is in part explained by the fact that, to a lesser or greater extent, the compliant medium is deforming rather than the workpiece, but this fact does not explain the high strength of bonds produced. The actual mechanism of bonding at the interface is believed to be diffusion, regardless of the type of bonding employed. Diffusion is a time and temperature dependent process. The load-temperature relations discussed above assume a constant bonding time, but with compliant medium bonding, where "killing" the bond is not such a problem, a slightly longer bonding time can be employed. This allows for greater diffusion at the interface, and a strong and better bond results. It is to be emphasized that the interrelation between all of the various parameters of bonding is a complex one, and the foregoing is offered only as a reasonable explanation. The same fundamentals apply to ultrasonic bonding as to thermocompression techniques, but the mechanisms at work are quite different. For example, heat is generated by both internal and external friction and hysteresis, in addition to any external sources that might be used. However, the foregoing explanation is also reasonable where ultrasonic energy is employed.

Figure 4:
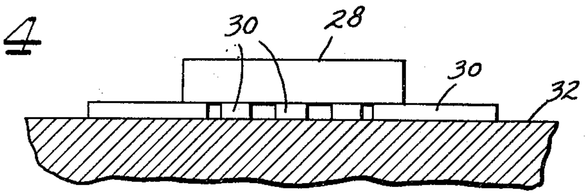
FIG. 4 is a side elevation of a beam-lead device positioned on a substrate.

FIGS. 4–7 illustrate the bonding of a beam-lead integrated circuit device to a substrate. As shown in FIG. 4, the device comprises a silicon chip 28 having gold leads 30 issuing therefrom. It rests on a substrate 32 having metallic land areas (not shown) under each lead.

Figure 5:
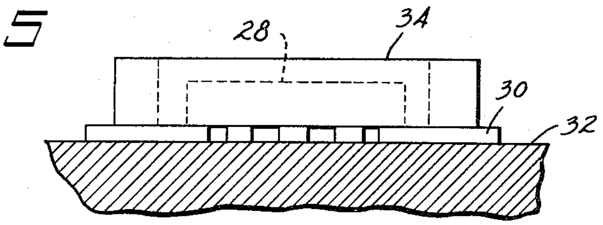
FIG. 5 is similar to FIG. 4 and shows the compliant medium in place.

As shown in FIG. 5, a hollow preform or lead frame 34 is placed over leads 30 and around device 28. Preform 34 extends substantially above the top of device 28 so that, during bonding, the hot ram will not press upon device 28. Many such devices and particularly the more simple beam lead transistors, have substantial structural strength, and the compliant medium can be caused to deform around the entire device and the leads, thus eliminating the need for a hollow preform 34. This has the further advantage of eliminating any possibility of bending or "bugging" of the device, although this has not been a problem when bonding with a hollow, compliant preform.

Figure 6:
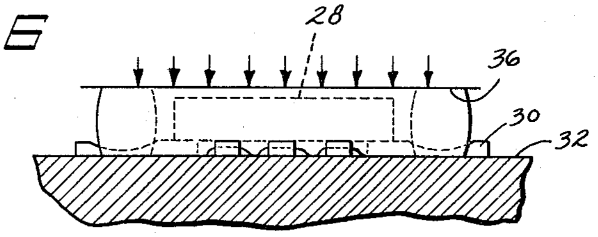
FIG. 6 is a side elevation of the assembly of FIG. 5 during thermocompression bonding in accordance with the invention.
Figure 7:
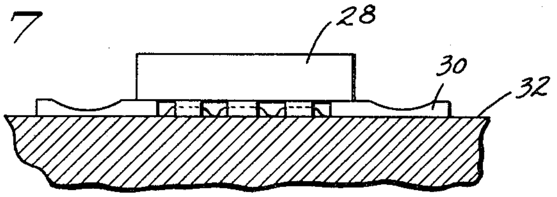
FIG. 7 is a side elevation of the device of FIG. 4 after bonding.

As illustrated in FIG. 6, a hot ram 36 is pressed down on the assembly, causing deformation of preform 34 and leads 30 in the same manner as described hereinabove in connection with FIGS. 1–3. It will be noted that preform 34 deforms in exact compliance with the leads even when they are very closely spaced. FIG. 7 illustrates the bonded device after removal of the preform.

The extent of deformation of the leads during bonding is apparently a function of the geometry of the compliant medium and the physical properties of the materials, more than anything else. FIGS. 1–3 and 4–7 illustrate two shapes of a compliant medium and two somewhat different lead deformations. Where the compliant medium is a sheet which covers essentially the entire lead right up to the device, bonds are made with little or not visible deformation of the lead. The obvious, if not entirely satisfactory, explanation for this is that the energy couple from the source of the interface is, relatively, a broad area one, and a good bond is made with little deformation other than at the interface. In the bonding of beam-lead devices, it is preferred to use a solid sheet of the compliant medium which covers the entire device and the leads, when the device is strong enough. Ram pressure is applied overall, the medium deforms around the device and the leads, and makes good bonds. Any tendency toward "bugging" is manifestly impossible, since the device and the leads are subjected to the same forces.

The foregoing can be illustrated by a specific example of the bonding of a 16-lead beam-leaded device to the Au/Ti land areas on a glass substrate. The compliant medium was 2024 aluminum 0.005 in. thick with a square 0.0535 in. hole punched therein. The device was positioned on the substrate and the aluminum was placed thereover, the hole just fitting over the body of the device. The ram was 718 stainless with a flat, Inconel tip heated by a 150 watt cartridge heater. Bonding was carried out for 1.5 seconds with a total ram pressure of about 48 pounds (3 pounds per lead) at a temperature of 400° C. Lateral deformation of the beams due to bonding was less than 10 percent. After bonding, the device could not be blasted loose with 400 psi compressed air. When a sharp probe was used to shear the device from the substrate, all 16 leads broke off and remained bonded to the substrate.

In general, it has been found that successful thermocompression bonds can be made in accordance with the invention at temperatures in the range of 350° – 500° C, bonding cycles of 1 to even 5 seconds, and at a ram force of 10 – 50 pounds. It will be appreciated, however, that all of these parameters are related. At lower temperatures, for example, longer cycles are in order, and vice versa.

Figure 8:
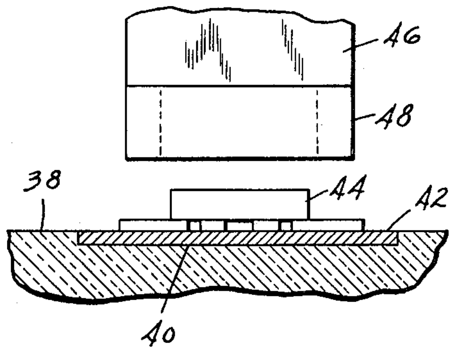
FIG. 8 is a side elevation showing a beam-lead device on a substrate ready for ultrasonic bonding in accordance with another embodiment of the invention.
Figure 9:
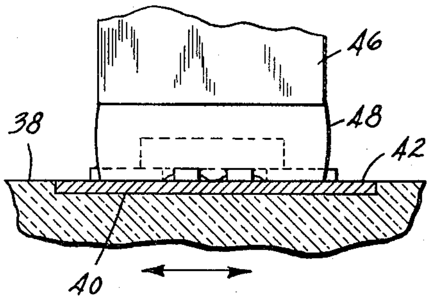
FIG. 9 is a side elevation of the assembly of FIG. 10 during ultrasonic bonding.

FIGS. 8 and 9 illustrate ultrasonic bonding with a compliant medium. In this embodiment a support or table 38 is provided which is connected to an ultrasonic horn for vibration in a direction parallel to the upper surface. It is convenient to provide a slight depression 40 in the upper surface of support 38 which conforms to the size of the substrate to which leads are to be bonded. A substrate 42 is placed in this depression and, as shown in FIGS. 8 and 9, a beam-lead device 44 is positioned thereon. A plunger or clamp 46 has a tip 48 which is a compliant medium capable of deforming around the device and clamping all the leads, regardless of size differences, securely to substrate 42. Plunger 46 can be hydraulic, cam actuated, solenoid actuated, or other suitable means can be employed.

Ultrasonic energy is applied and causes support 38 to vibrate in the direction shown by the arrow in FIG. 9, i.e., parallel to the surface. The bond is made in the conventional ultrasonic manner.

It has been heretofore disclosed that heat can be advantageously applied during ultrasonic bonding to facilitate deformation of the compliant medium about the devices. The application of heat through a conventional ultrasonic bonding tip creates problems, however, in that the sonic properties of the tip are in part temperature dependent. This problem is eliminated in the present invention because the heat can be applied through plunger 46 and compliant medium 48.

Figure 10:
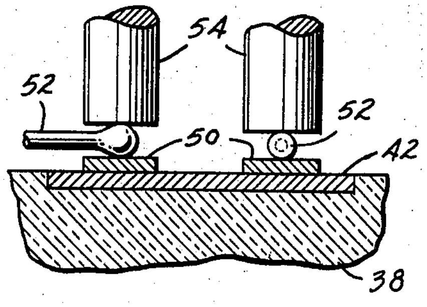
FIG. 10 is a side elevation showing all parts in place for ultrasonic bonding of a plurality of balled wire leads to a substrate in accordance with another embodiment of the invention.
Figure 11:
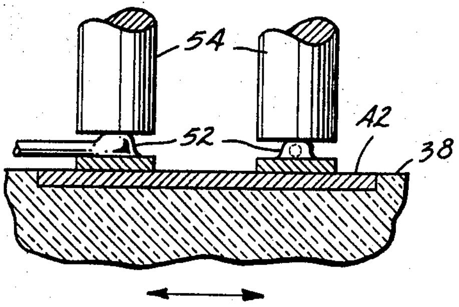
FIG. 11 is a side elevation showing the assembly of FIG. 10 during ultrasonic bonding.

The ultrasonic bonding of two balled wire leads to land areas on a substrate is shown in FIGS. 10 and 11. The substrate 42 has two conductive land areas 50 and two balled leads 52 are positioned thereon. It will be noted that leads 52 differ substantially in size. In this instance discrete, spring-loaded plungers 54 may be employed without the compliant member 48, each plunger 54 accommodating one lead and clamping it firmly to the substrate. Bonding is carried out in the same manner as described above in connection with FIGS. 8 and 9, and heat is advantageously supplied through plungers 54. It will be appreciated that unless the plungers 54 are provided with a compliant medium, the embodiment of FIGS. 10 and 11 is suitable only for bonding wire leads or relatively large devices, and could not be used for bonding very small beam-lead or integrated circuit devices.

Figure 12:
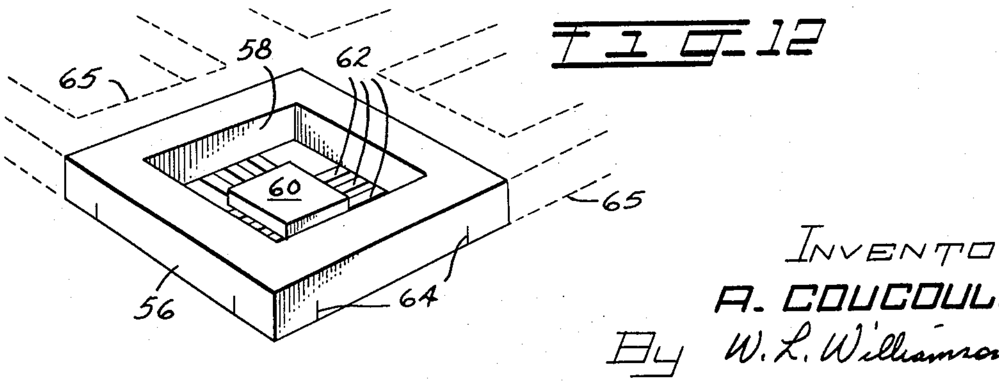
FIG. 12 is a perspective view of a lead frame for a beam-lead device or devices for use in thermocompression bonding in accordance with the invention.

FIG. 12 illustrates the use of a compliant medium, particularly a film-forming metal, as a lead frame for one or more discrete beam-lead devices. A rectangular frame 56 having an aperture 58 is provided, into which the device 60 is placed through the bottom, the leads 62 of device 60 being lightly adhered to the underside of frame 56 by use of an adhesive. Alternatively, aperture 58 may be sized so that the body 60 fits snugly therein and is frictionally retained. Indexing marks 64 are provided on the outside of frame 56 and are designed to register with corresponding marks on the substrate to which the device is to be attached. Similar marks (not shown) on the underside of frame 56 will facilitate the accurate placement of the device within the frame. In this manner, proper registration of each lead with its corresponding land area on the substrate in considerably simplified. The dotted lines 65 show how frame 56 may be part of a much larger frame holding a plurality of devices 60. As noted hereinabove, the lead frame may take the form of a long ribbon or tape of the compliant medium. Also, indexing may be accomplished with optical equipment by having small holes in the tape or lead frame. As will be appreciated, the lead frame may be used to position a plurality of devices relative to a substrate for multichip bonding.

Figure 13:
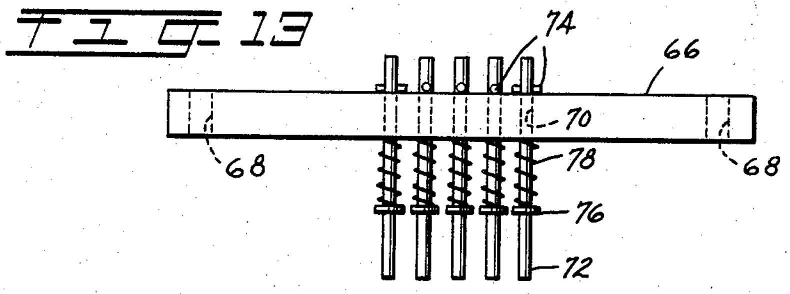
FIG. 13 is a side elevation of a jig for use in wide area compliant bonding in accordance with the invention.
Figure 14:
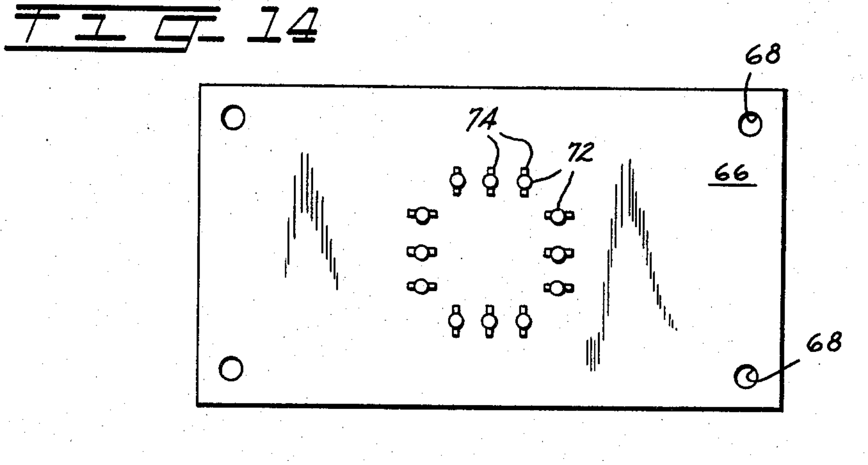
FIG. 14 is a plan view of the jig shown in FIG. 13.

FIGS. 13 and 14 are elevation and plan views, respectively, of a jig suitable for multichip bonding or for multiple lead bonding where the leads are spaced over a relatively large area. A plate 66 is provided with apertures 68 for attachment in exact registry to pins on a bonding machine. A set of apertures 70 is provide equal in number to and spaced for registry with widely spaced leads or with a plurality of spaced devices to be bonded. A pin 72 having a stop-key 74 near one end and a collar 76 near the other is placed in each aperture 70 with a spring 78 partially compressed between collar 76 and the underside of plate 66, stop-key 74 serving to retain each pin 72 in position. When the jig is employed to bond a plurality of devices, a compliant medium is used in conjunction with the pins.

Plate 66 is mounted in a vertically movable fixture in a bonding machine and, when the devices 60 are positioned on a suitable substrate on the support, the fixture is lowered. The tips of pins 72 engage the individual devices through a compliant medium and, as the fixture is lowered still more, springs 78 are further compressed, exerting through pins 72 a clamping force sufficient to effect bonding upon the application of heat and/or ultrasonic energy. If desired, thermal energy may be applied by passing a hot gas around the bond regions instead of heating the pins directly.

Figure 15:
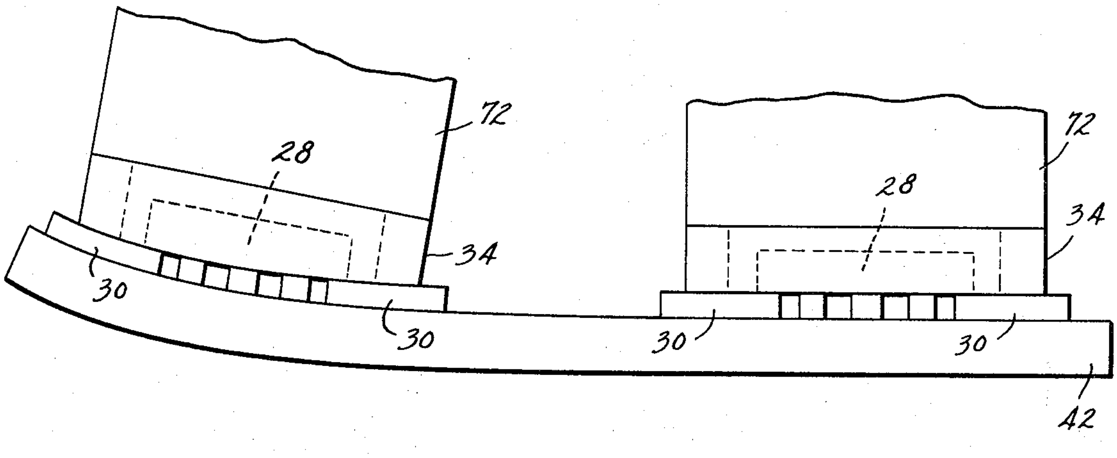
FIGS. 15 and 16 are side elevations showing the jig of FIG. 13 used for multichip bonding.
Figure 16:
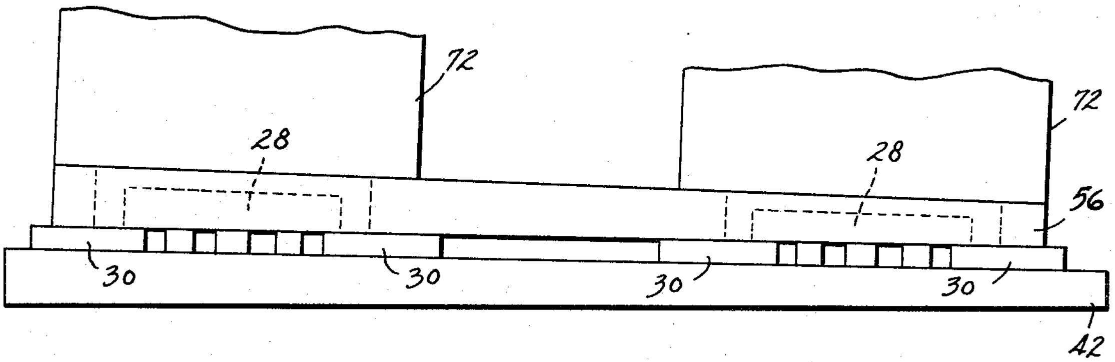

Referring now to FIGS. 15 and 16, in multichip bonding where there are irregularities in the substrate 42 such as warpage (FIG. 15), lack of parallelism (FIG. 16) and waviness, it is necessary to compensate for such irregularities in the substrate as well as irregularities in the leads and/or land area, e.g., variations in thickness, etc. Irregularities between bonding areas on the substrate may be compensated for by the pins 72 and localized irregularities in the leads, land areas and substrate are compensated for by the compliant medium, preform 42 and lead frame 56. In this manner, multichip bonding becomes highly practical and permits any number of devices to be bonded simultaneously.

In FIG. 15, a substrate 42 is illustrated which is warped. For purposes of illustration, the warpage is greatly exaggerated. As will be appreciated, if a single tool were employed to engage the compliant medium at each bonding site, the tool would first engage the preform 34 which is on the left and would apply excessive force to that area of the substrate thereby possibly fracturing the substrate whereas insufficient pressure to effect a bond would be applied to the preform 34 which is on the right. By employing pins 72 which are individually displaceable, the pin 72 engaging the preform 34 which is on the left is urged against its associated spring 78 to permit the jig to continue to advance to bring the pin 72 on the right into engagement with the preform 34 which is on the right. In this manner, the pins 72 are permitted relative displacement to compensate for irregularities between bonding areas on the substrate. The compliant medium, preform 34, compensates for localized irregularities in the leads, land areas and substrate as discussed hereinbefore. Bonding energy can be applied by ultrasonically vibrating the substrate and/or heating the pins 72. As will be appreciated, any suitable configuration for the compliant medium can be used.

In FIG. 16, a substrate 42 is illustrated which in nonparallel, i.e., tapered. The degree of nonparallelism is also exaggerated for illustrative purposes. As in the embodiment of FIG. 15, if a single tool were employed to engage the compliant medium at each bonding area, the tool would first engage the lead frame 56 above the left-hand device and would apply excessive force to that area of the substrate thereby possibly fracturing the substrate whereas insufficient force to effect a bond would be applied to the lead frame above the right-hand device. By employing individually displaceable pins, these irregularities between bonding areas on the substrate may be compensated for as set out above. The compliant medium, lead frame 56, compensates for localized irregularities in the leads, land areas and substrate as discussed hereinbefore. Bonding energy can be applied by ultrasonically vibrating the substrate and/or heating the pins 72. As will be appreciated, any suitable configuration for the compliant medium can be used.

Also, in the embodiments of FIGS. 15 and 16, the pins 72 are conveniently permitted sufficient lateral displacement in the jig to facilitate displacement of each pin into parallelism with the compliant member.

It is usually desirable to employ a compensating base to support the substrate during bonding. An suitable compensating base may be employed such as those disclosed in U.S. application, Ser. No. 753,830, filed Aug. 16, 1968, by R. H. Cushman and assigned to Western Electric Company, Incorporated.

Figure 17:
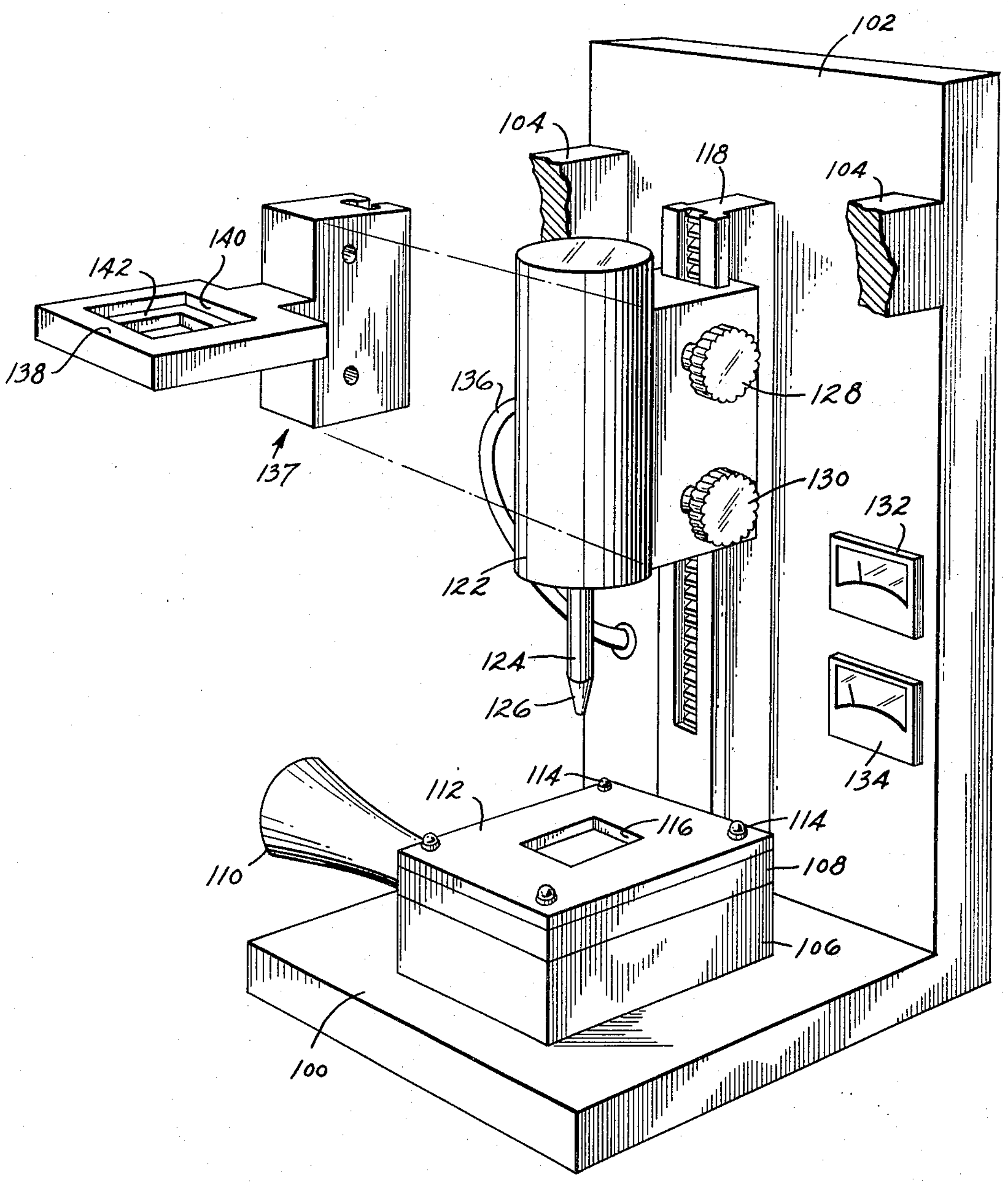
FIG. 17 is a partial perspective view of a machine capable of making either thermocompression or ultrasonic bonds in accordance with the invention.

FIG. 17 is a simplified perspective view of a bonding machine suitable for use in compliant bonding.

With reference to FIG. 17, a base 100 is integral with a back portion 102 which, together, form the support for the machine. A generally U-shaped arm 104 (shown partially) extends outwardly from the back 102 and supports a suitable binocular microscope (not shown) for use by the operator in positioning the various parts. Base 100 has provided thereon a rigid table 106 on which there rests a plate 108 which is coupled to an ultrasonic horn 110 adapted to vibrate plate 108 in the horizontal plane. The ultrasonic energy source is conventional and is not shown. A second plate 112 is screwed onto plate 108 by means of four screws 114. Plate 112 is provided with a central depression 116 on the top surface thereof adapted to contain and retain a specific substrate. The reason for providing separate plate 112 is so that variously sized substrates or circuit boards can be easily accommodated.

An upright member 118 is centrally located against back 102; this is provided for the mounting of the vertically movable portions of the machine. Member 118 has a rack 120 on the forward vertical surface thereof which engages a pinion or pinions (not shown) on the vertically movable elements, much in the same manner as the barrel of a microscope is raised and lowered on its frame.

For thermocompression bonding, a hydraulic or solenoid actuated ram mechanism 122 is mounted on member 118. Ram mechanism 122 has a downwardly extending ram 124 with a replaceable tip 126. The reason for having tip 126 is, again, to accommodate variously sized devices, and different types of tips. Thus, tip 126 may be of a plastically deformable film-forming metal, it may be apertured, it may be a flat piece of molybdenum (i.e., where a lead frame is employed), or it may be a suitable fixture for retaining a jig of the type illustrated in FIGS. 13 and 14. Coarse and fine adjustments 128, 130 are provided for positioning ram 124 prior to bonding. A dial 132 indicates ram pressure and a dial 134 indicates ram temperature. Power necessary for actuating and heating the ram is provided via line 136. Other controls (not shown) are provided as required.

For ultrasonic bonding in accordance with the invention, ram mechanism 122 is replaced by fixture 137. This also has a pinion gear or gears (not shown) and is adapted to be mounted on rack 120 on member 118. Fixture 137 has a simple frame 138 with an aperture 140 having an annular shoulder 142 therein. Aperture 140 and shoulder 142 are adapted to contain and retain a jig such as is illustrated in FIGS. 13 and 14. Threaded posts (not shown) are provided on shoulder 142 to register with the apertures (68, 82) of the jig so that the latter can be screwed down.

The substrate is placed in depression 116 and the device (or leads) is positioned thereon. The operative element either ram 124 or fixture 137 is then lowered to engage the assembly, and bonding energy is supplied by either ram 124 or horn 110. In either case, all of the leads are bonded simultaneously, and bonding is both quick and reliable.

It will be understood that various changes in the details, steps, materials and arrangements of parts, which have been herein described and illustrated in order to explain the nature of the invention, may be made by those skilled in the art.

What is claimed is:

1. A jig for clamping a multi-leaded device to a substrate for bonding thereto comprising:

an apertured plate, the apertures of said plate corresponding in number and position to the leads of said device;

a pin slidably mounted in each said aperture for transmitting a clamping force to retain one of said leads;

spring means engaging each said pin and said plate and tending to force each said pin in a direction axially along the associated aperture to provide said clamping force; and means associated with each said pin for retaining said pin in said aperture.

2. A device for compliant bonding at least two first workpieces to widely spaced bonding sites on a second workpiece, said device comprising:

a compliant medium associated with each bonding site for engaging said workpieces, and means for simultaneously applying bonding pressure to said compliant medium at all of the bonding sites with the pressure applied at each individual bonding site being independent of the pressure applied at each other bonding site so as to compensate for workpiece irregularities between said bonding sites while compliantly bonding each first workpiece to said second workpiece.

3. The device of claim 2 wherein the first workpieces are beam-lead devices.

4. The device of claim 3 wherein the means for independently applying bonding pressure to each bonding site is a plurality of individually displaceable pins.

5. The device of claim 2 wherein the first workpieces are discrete leads.

6. The device of claim 5 wherein the means for independently applying bonding pressure to each bonding site is a plurality of individually displaceable pins.

7. A device for compliantly bonding at least two first workpieces to widely spaced bonding sites on a second workpiece, said device comprising:

a compliant medium associated with each bonding site for engaging each first workpiece;

a plurality of individually mounted pins, each pin being associated with a bonding site on said second workpiece; and means for applying sufficient energy independently through each of said individually mounted pins and said compliant medium to each respective associated bonding site to compliantly bond each first workpiece to said second workpiece while compensating for workpiece irregularities between said bonding sites.

8. The device of claim 7 wherein each pin is spring biased to permit individual displacement of each pin to compensate for workpiece irregularities between bonding sites.

9. The device of claim 8 wherein a compliant medium is secured to each pin.

10. The jig of claim 1, further comprising:

a compliant medium engaging the extremity of each pin furthest along said axial direction.

11. The jig of claim 10 wherein the compliant medium is secured to each pin.

12. The jig of claim 10 wherein each of a plurality of independent members composed of the compliant medium engages an extremity of a different pin.

* * * * *